United States Patent [19]

Brooks

[11] Patent Number: 4,546,012

[45] Date of Patent: Oct. 8, 1985

[54] LEVEL CONTROL FOR A FLUIDIZED BED

[75] Inventor: Lionel H. Brooks, Austin, Tex.

[73] Assignee: Carbomedics, Inc., Austin, Tex.

[21] Appl. No.: 604,028

[22] Filed: Apr. 26, 1984

[51] Int. Cl.$^4$ ............................................... B05D 7/00
[52] U.S. Cl. .............................. 427/213; 118/DIG. 5; 118/624; 118/715; 118/733; 427/215; 427/249; 427/255.5
[58] Field of Search ............ 427/213, 215, 249, 255.5; 118/733, 715, 624, DIG. 5

[56] References Cited

U.S. PATENT DOCUMENTS 3,977,896 8/1976 Bokros et al. ....................... 427/213

Primary Examiner—Norman Morgenstern
Assistant Examiner—Janyce A. Bell
Attorney, Agent, or Firm—Fitch, Even, Tabin & Flannery

[57] ABSTRACT

Fluidized bed apparatus for use in applying a coating, having a relatively lesser density, to particles, having relatively greater densities by causing passage of a gaseous atmosphere through a bed of the particles. The apparatus includes an enclosure holding a bed of the particles and means for causing flowing of the gaseous atmosphere carrying a material for forming the coating through the bed of particles to be fluidized. The apparatus further includes means for adding seed particles to the bed and weir tube means removing coated particles from the bed when the contents of the bed achieves a predetermined level. Finally, the apparatus includes discharge means receiving the coated particles from the tube means and conveying them to a collection location remote from the enclosure.

10 Claims, 3 Drawing Figures

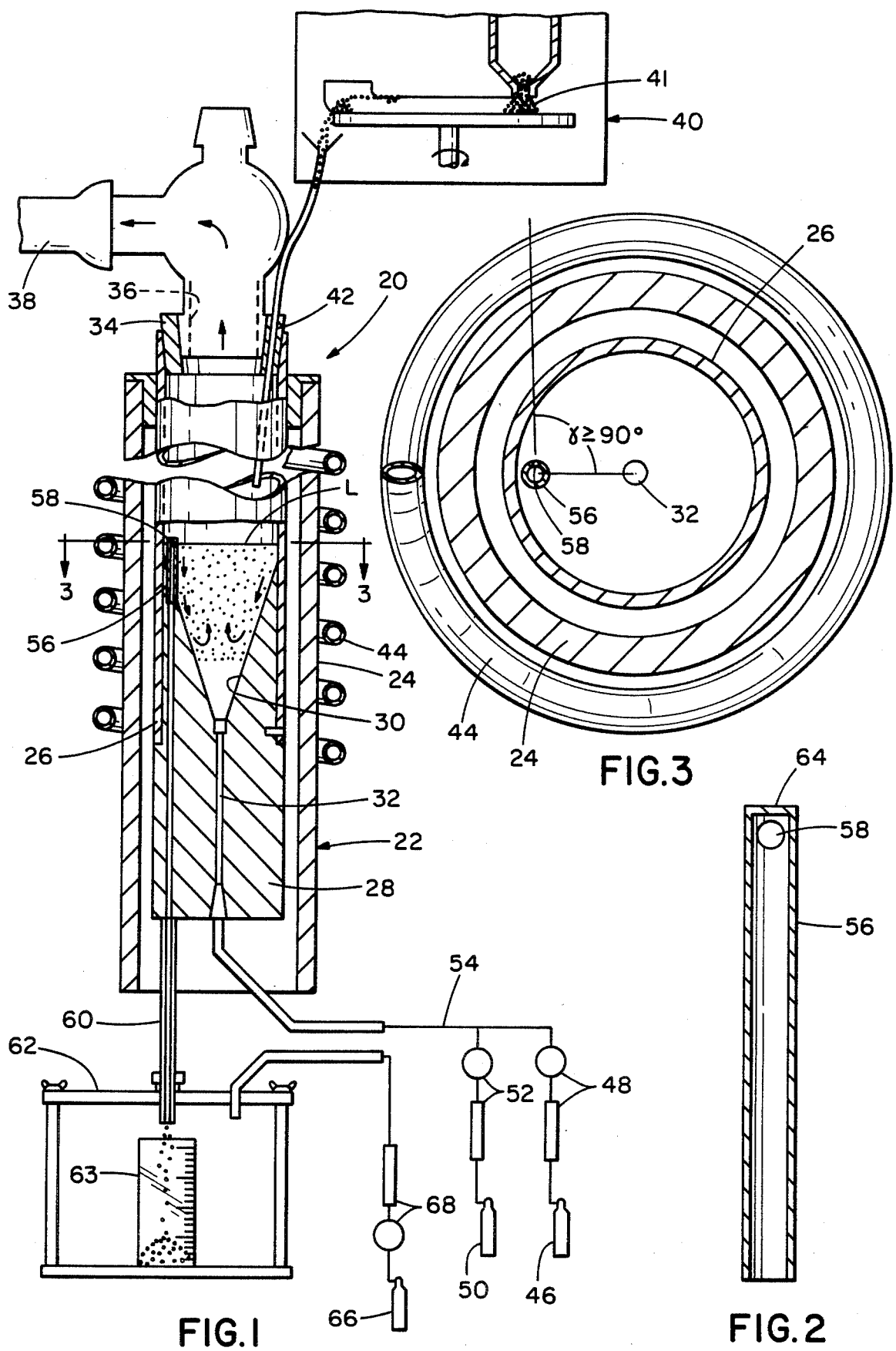

LEVEL CONTROL FOR A FLUIDIZED BED

BACKGROUND OF THE INVENTION

This invention relates to level control and, more particularly, to a method and apparatus for maintaining a predetermined upper level in a fluidized particle bed.

It is desirable to deposit pyrolytic carbon coatings on certain objects. For example, uranium particles can be coated with a pyrolytic carbon which, in part, forms a pressure-retentive shell allowing the coated particles to be fabricated into fuel rods for use in nuclear reactors. Another important use for such coatings is for heart valve and other biomedical components because a pyrolytic carbon coating does not react with blood.

Pyrolytic carbon is usually deposited on an object by thermally decomposing gaseous hydrocarbons or other carbonaceous substances in vaporous form in the presence of the object. When pyrolytic carbon is deposited in a fluidized bed apparatus, one of the variables upon which the structure of the pyrolytic carbon will be dependent is the amount of available deposition surface area relative to the volume of the furnace enclosure wherein the deposition is occurring. Pyrolytic carbon which has a microstructure that has smaller growth features will be deposited when the relative amount of deposition surface area is fairly high. Thus, when relatively large objects; for example, objects having at least one dimension equal to 5 mm. or more, are being coated, an ancillary bed of small particles (usually of a size measured in microns) is included within the furnace enclosure together with the larger objects. This arrangement provides sufficient available total surface area to assure that pyrolytic carbon having the desired crystalline form will be deposited. In addition, the random motion of large objects in fluidized beds provides for a relatively uniform deposition of carbon on all surfaces.

However, whenever such submillimeter particles are being coated in a fluidized bed, the total surface area of the particles begins to increase significantly as the diameters of the pyrolytic carbon-coated particles grow. This change in the available deposition surface area in the fluidized bed will result in a change in the physical characteristics of the pyrolytic carbon being deposited if the other coating variables are held constant, e.g., coating temperature, gas flow rate and gas composition; and moreover, when the bed reaches some maximum size, it will collapse and thus limit the thickness of the carbon coating that can be deposited on levitated substrates under constant input conditions. Changes in the physical characteristics of the carbon deposited may be undesirable for any of a number of reasons.

It has been found that pyrolytic carbon having good structural strength and uniform physical properties can be deposited as relatively thick coatings upon relatively large objects in the accompaniment of particles if the available fluidized bed surface area is maintained relatively constant by withdrawing particles which have become enlarged in size as a result of coating and feeding smaller size particles into the deposition enclosure. Commonly assigned U.S. Pat. No. 3,977,896, the teachings of which are hereby incorporated by reference, is directed to this type of process for depositing pyrolytic carbon coatings. In that patent the flow of gaseous atmosphere is introduced beneath and generally centrally of the particle bed. Seed particles having relatively greater densities than that of the coating are introduced to the bed causing the coated particles to levitate where they can be removed through a withdrawal tube, the open end of which is positioned near the top of the bed. The rate at which the particles are removed is controlled by regulating the rate of flow of an inert gas up the tube. The seed particle input is at a constant rate, and the output is measured so that by varying the purge gas flow rate to regulate the output, a substantially constant bed total surface is achieved.

While such a coating process works well, the need for measuring the output and varying the purge gas flow rate in response thereto introduces certain complexities which it is desirable to avoid. It has been found that in many coating applications proper coating can be achieved by maintaining the bed at a predetermined level. The fluidized bed coating process requires an operating temperature of between 1200° and 2000° C. Prior art sensors for detecting bed level to control the rate of addition or removal are inoperable or unreliable under these fluidized bed operating conditions.

SUMMARY OF THE INVENTION

One of the objects of the present invention is to provide reliable level control for a fluidized bed operating at elevated temperatures. The level control of the present invention operates to substantially eliminate dust from the particle discharge pipe for the bed apparatus, which dust otherwise could interfere with the collection of withdrawn particles. The level control also functions to reduce the ratio of smaller particles to larger particles being withdrawn to enhance the coating efficiency of the fluidized bed apparatus. As the level control operates passively to achieve maintenance of a predetermined bed level, the complexity of the overall fluidized bed system is reduced because the need to weigh the output and input, and continually change a flow rate in response thereto is eliminated. Another objective of the level control is reliability, long service life, and simplicity of manufacture. Other features and objects of the present invention will be, in part, apparent and, in part, pointed out hereinafter in the following specification and attendant claims and drawings.

Briefly, fluidized bed apparatus of the present invention includes an enclosure holding the bed of the particle and means for causing upward flow of the gaseous atmosphere carrying a material for forming the coating through the bed of particles to fluidize the particles. Means for adding seed particles to the bed is provided, and weir tube means removes coated particles from the bed when the contents of the bed achieves a predetermined level. Finally, the apparatus includes discharge means removing the coated particles from the tube and conveying them to a collection location.

BRIEF DESCRIPTION OF THE DRAWINGS

FIG. 1 is a front elevational view, partly sectional and partly schematic in nature, of fluidized bed apparatus of the present invention, including a weir tube for use in level control;

FIG. 2 is an enlarged longitudinal sectional view of the weir tube of FIG. 1; and FIG. 3 is a sectional view, enlarged in size, taken generally along line 3—3 of FIG. 1 depicting the angular orientation of the spillover hole of the weir tube with respect to the central portion of the fluidized bed.

DESCRIPTION OF THE PREFERRED EMBODIMENT

Referring now to the drawings, fluidized bed apparatus for applying a pyrolytic carbon coating to objects, is generally indicated by reference character 20. The apparatus includes a furnace 22 having a cylindrical outer shell 24. The furnace shell 24 supports the coating enclosure which is defined by a tube 26 having an insert 28 affixed thereto at its lower end. The insert 28 provides the internal coating enclosure with a conical bottom surface 30. A central passageway 32 extends vertically upward through the insert 28, coaxial with the tube 26, and the coating and fluidizing atmosphere is supplied upwardly through this passageway.

The upper end of the tube 26 is provided with a removable closure 34 that may be mounted in any suitable manner; the closure 34 includes a central exit passageway 36 through which the fluidizing and coating gases leave the furnace enclosure and which is connected to an exit conduit 38 through which the gases may be routed for subsequent treatment if desired. An injection device 40 is mounted above the closure and is designed to feed minute particles 41 into the coating enclosure at a desired rate by dropping them downward through an opening 42 in the closure where they will fall nearly the length of the tube 26 until they enter and become a part of the fluidized bed. Induction or alternate heating means 44, is provided for heating the active deposition region of the furnace and the particles and objects being coated to the desired deposition temperature.

In the fluidized bed coating apparatus 20, sometimes referred to hereinafter as a "steady-state bed", the bed of minute particles, submillimeter in size, are levitated generally near the bottom of the heating enclosure in approximately the location shown in FIG. 1 by the upward flowing gas stream. The gas stream is usually made up of a mixture of an inert fluidizing gas plus a carbonaceous substance, such as a gaseous hydrocarbon, for example, methane, ethane, propane, butane or acetylene, or some other carbon-containing substance that is gaseous or easily vaporizable. In FIG. 1, a source 46 of hydrocarbon is illustrated which is equipped with a flow-regulating valve arrangement 48. Also illustrated is a source 50 of inert gas, for example, helium, argon or nitrogen, which is likewise equipped with a suitable flow-regulating valve arrangement 52. These two sources flow into a common line 54 which connects to the vertical passageway 32 in the insert 28.

The total flow of the gas upward through the coating enclosure is regulated so that the fluidized bed occupies the region near the bottom of the tube 26 as depicted in FIG. 1. The upward flow of the gaseous atmosphere through the central passageway causes a generally annular flow pattern to be established in the fluidized bed region, with the minute particles traveling upward in the central portion of the enclosure and then downward generally along the outer perimeter thereof. When particles having a density of at least about 3 grams/cm$^3$ (i.e., greater than the density of the carbon coating) are used, they will gradually become less dense as they grow in size. The smaller uncoated particles tends to remain in the lower portion of the bed while the less dense coated particles are levitated to the upper portion of the bed. A preferred material for the particles is zironium oxide which has a density of about 5.5 grams/cm$^3$.

A weir tube 56, formed of a refractory material, such as graphite or mullite, extends through a vertical hole in the enclosure insert 28 and through a portion of the bed of particles and thereabove adjacent a side of the bed. A spillover hole or entrance 58 in the tube 56 defines a predetermined maximum level L for the bed of particles. When this level is reached, the continuous addition of seed particles in concert with the fluidization of the bed caused by the upward flowing gas stream results in withdrawal of particles having substantial coating thicknesses. An exit conduit 60 receives the withdrawn particles form the weir tube 56 and channels them into a collection chamber 62 where they are received in a container 63.

Referring to FIGS. 2 and 3, the weir tube 56 is provided with a hood 64 to close the upper end of the tube against the entrance of airborne particles and dust. Due to the fluidization process, there is some bubbling and splashing of the particles predominately in the central portion of the bed. When the bubbles burst, particles are sprayed generally radially with respect to the vertical axis of the bed. As the gas bubbles tends to pick up particles from adjacent the bottom of the bed, the sprayed particles tend to be the smaller, relatively thin-coated ones, and therefore, it is not desired that such particles be withdrawn. It is important that the spillover hole is positioned facing away from the central portion of the bed where the bubbling is most likely to occur. More specifically, the spillover hole should face at ninety degrees or greater with respect to the radius intersecting the axis of the weir tube. Furthermore, the weir tube is preferably disposed away from the axis of the bed by a distance equal to at least two-thirds of the spacing between the bed axis and the tube 26. Since the particles which become airborne due to bubbling of the bed do not travel circumferentially, the positioning of the spillover hole 58 facing away from the central portion of the bed, substantially eliminates the entrance of airborne particles in the spillover hole.

The collection chamber 62 is preferably pressurized with inert gas from a suitable source 66 with the rate of gas flow controlled by a valve 68. The flow of inert gas through the collection chamber 62 and up the weir tube 56 through the exit conduit 60 acts as a purge to prevent substantial quantities of dust from falling down into the collection chamber thus maintaining clear the glass walls forming the chamber to permit observation by the operator that the apparatus is functioning properly. It will be appreciated that the flow of inert gas does not have to be varied as it would if it were used to regulate the particle withdrawal rate as in U.S. Pat. No. 3,977,896. Here the purge gas flows at a constant, relatively slow rate sufficient to prevent movement of substantial quantities of dust into the collection chamber 62, but insufficient to prevent coated particles from falling down the weir tube 56 into the collection chamber.

Operation of the apparatus of the present invention is as follows: A supply of particles 41, along with the object or objects to be coated, are placed in the coating enclosure and the enclosure is brought up to its operating temperature of 1200 to 2000 degrees Centigrade with the fluidizing gas flowing. After the operating temperature is attained, the coating gas valve is opened so that the coating gas and the fluidizing gas both flow through the input line 54. The bed level starts to rise slowly due to the particles in the bed acquiring a pyrolytic carbon coating because of the thermal decomposition of the gaseous carbonaceous substances. After a while, the injection device 40 is turned on to add seed particles 41 which increases the rate at which the bed rises. There is also bubbling of the fluidized particles in the central region of the bed above the location of the central gas inlet passageway 32. Although such bubbling and splashing causes particle movement above the predetermined level L established by the position of the spillover hole 58 in the weir tube, such airborne particles cannot enter the tube in significant quantity because the spillover hole faces away from the central bed region. Of course, the circulation provided by the fluidization causes the less dense coated particles to levitate with the just added seed particles and only lightly coated particles, which have greater densities, more likely to remain near the bottom of the bed. When the bed level reaches the spillover hole 58, particles enter the hole where they fall down the tube 56, through the exit conduit 60 and are collected in the container 63 disposed in chamber 62. The provision of hood 64 and the slow purge of inert gas up the weir tube 56 insure that the major portion of dust is removed through the exit conduit 38 and does not travel with the particles through the weir tube.

Upon completion of the coating process, the apparatus 20 is disassembled and the coated objects removed. It will be appreciated that the contents of the container 63 includes small and large particles. The contents can be screened and the large particles disposed of and the smaller ones recycled.

While the fluidized bed apparatus of the present invention has been described in terms of applying a pyrolytic carbon coating to objects due to thermal decomposition of gaseous carbonaceous substances in the presence of the particles, it will be appreciated that the present invention is not limited to this particular use, but has utility in other applications where coatings are to be applied to particles by flowing a gas including the coating material through a bed of the particles.

As a method of providing level control for fluidized bed apparatus, the present invention comprises the following steps:

(A) A substantially vertical weir tube is provided extending through a portion of the particle bed and thereabove adjacent a side of the bed.

(B) A spillover hole is provided in the tube disposed to define a predetermined level of the bed.

(C) The hole is angularly positioned so that it faces away from a central portion of the bed.

(D) The upper end of the tube is covered and the tube is purged at a substantially constant flow rate sufficient to prevent a substantial quantity of dust from moving down the tube but insufficient to prevent coated particles from moving down the tube.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. Fluidized bed apparatus for use in applying a coating, having a relatively lesser density, to particles, having relatively greater densities, by causing passage of a gaseous atmosphere through a bed of said particles, said apparatus comprising:

an enclosure for holding a bed of said particles;

means for causing flow of said gaseous atmosphere carrying a material for forming said coating upward through said bed of particles to fluidize said particles; and a weir tube defined by a sidewall and having a spillover entrance hole for defining a maximum particle level for said bed by receiving and removing particles having substantial coatings from said bed but not removing substantial quantities of uncoated or lightly coated particles when the contents of said bed achieves said level, whereby the relatively less dense coated particles levitate to the top of said bed where they are removed from said bed through said weir tube entrance hole.

2. Apparatus as set forth in claim 1 wherein said means for causing flow is adapted to cause said gaseous atmosphere to flow from underneath said bed and substantially centrally thereof, said weir tube being substantially vertically disposed and extending through a portion of said bed and thereabove adjacent a side thereof.

3. Apparatus as set forth in claim 2 wherein said means for causing flow of said gaseous atmosphere causes bubbling of said bed of particles above said predetermined level, said bubbling being generally confined to the central portion of said bed, said spillover hole facing away from said central portion whereby particles moving generally radially with respect to the vertical axis of said bed due to bursting of the bubbles are substantially prevented from gaining entrance to said tube.

4. Apparatus as set forth in claim 2 wherein said weir tube further comprises a hood for closing the upper end of said tube to prevent dust from entering said tube.

5. Apparatus as set forth in claim 1 further comprising means for heating said enclosure, said coating comprising pyrolytic carbon and said gaseous atmosphere including a carbonaceous substance, said heating means providing a sufficient temperature to cause thermal decomposition of said substance and deposition of said coating on said particles.

6. Apparatus as set forth in claim 5 wherein said weir tube is fabricated of a refractory material.

7. Apparatus as set forth in claim 1 further comprising discharge means for receiving said coated particles from said tube means and conveying them to a collection location remote from said enclosure.

8. Apparatus as set forth in claim 7 wherein said discharge means comprises an exit conduit, said apparatus further comprising means for supplying a slow purge of gas to said exit conduit insufficient to prevent the falling of particles down said tube but sufficient to prevent the movement of substantial dust down said tube.

9. A method of providing level control in fluidized bed apparatus of the type for applying a coating to particles having greater densities than that of said coating by flowing a gaseous atmosphere through a bed of said particles, said apparatus comprising an enclosure for holding said bed of particles, means for causing flowing of said gaseous atmosphere carrying a material for forming said coating through said bed of particles to fluidize them, and means for adding seed particles to said bed; said level control method comprising:

(a) providing a substantially vertical weir tube so it extends through a portion of said bed and thereabove adjacent a side of said bed;
(b) providing a spillover hole in a sidewall of said tube extending through said sidewall and disposed to define a predetermined level of said bed;
(c) positioning said hole angularly so that it faces away from a central portion of said bed; and
(d) covering the upper end of said tube.

10. A method of level control as set forth in claim 9 further comprising the step of purging said tube at a substantially constant flow rate sufficiently to prevent a substantial quantity of dust from moving down said tube but insufficiently to prevent coated particles from moving down said tube.

* * * * *